(12) United States Patent
Fanson et al.

(10) Patent No.: US 7,629,553 B2
(45) Date of Patent: Dec. 8, 2009

(54) METAL OXIDE NANOPARTICLES AND PROCESS FOR PRODUCING THE SAME

(75) Inventors: Paul T. Fanson, Brighton, MI (US); Jonathan Phillips, Rio Rancho, NM (US); Claudia Luhrs, Rio Rancho, NM (US)

(73) Assignees: UNM.STC, Albuquerque, NM (US); Toyota Motor Engineering & Manufacturing North America, Inc., Erlanger, KY (US)

( * ) Notice: Subject to any disclaimer, the term of this patent is extended or adjusted under 35 U.S.C. 154(b) by 176 days.

(21) Appl. No.: 11/449,373

(22) Filed: Jun. 8, 2006

(65) Prior Publication Data

US 2007/0075052 A1    Apr. 5, 2007

Related U.S. Application Data

(60) Provisional application No. 60/688,617, filed on Jun. 8, 2005.

(51) Int. Cl.
*B23K 10/00* (2006.01)

(52) U.S. Cl. ............................ 219/121.59; 219/121.38; 219/121.48; 428/403

(58) Field of Classification Search ............ 219/121.36, 219/121.37, 121.38, 121.48, 121.59; 428/402, 428/403
See application file for complete search history.

(56) References Cited

U.S. PATENT DOCUMENTS

| | | | | |
|---|---|---|---|---|
| 5,984,997 | A * | 11/1999 | Bickmore et al. | 75/343 |
| 5,989,648 | A * | 11/1999 | Phillips | 427/456 |
| 6,268,054 | B1 * | 7/2001 | Costantino et al. | 428/403 |
| 6,447,848 | B1 * | 9/2002 | Chow et al. | 427/446 |
| 6,569,397 | B1 | 5/2003 | Yadav et al. | |
| 6,716,525 | B1 * | 4/2004 | Yadav et al. | 428/402 |
| 2004/0009118 | A1 | 1/2004 | Phillips et al. | |

* cited by examiner

*Primary Examiner*—Mark H Paschall
(74) *Attorney, Agent, or Firm*—Gifford, Krass, Sprinkle, Anderson & Citkowski, P.C.

(57) ABSTRACT

There is disclosed a process for producing metal oxide nanoparticles. The process includes the steps of: a) providing at least two precursor metal salt materials, b) passing the at least two precursor metal salt materials through a plasma torch forming a vaporized material, and then c) condensing the vaporized material forming a metal oxide nanoparticle.

31 Claims, 15 Drawing Sheets

Figure 1 SEM images of examples of 75% cerium oxide, 25% aluminum oxide micron size particles with variegated surfaces Figure 2 TEM image of a cluster of $CeO_2/ZrO_2$ core Al2O3 shell nanoparticles

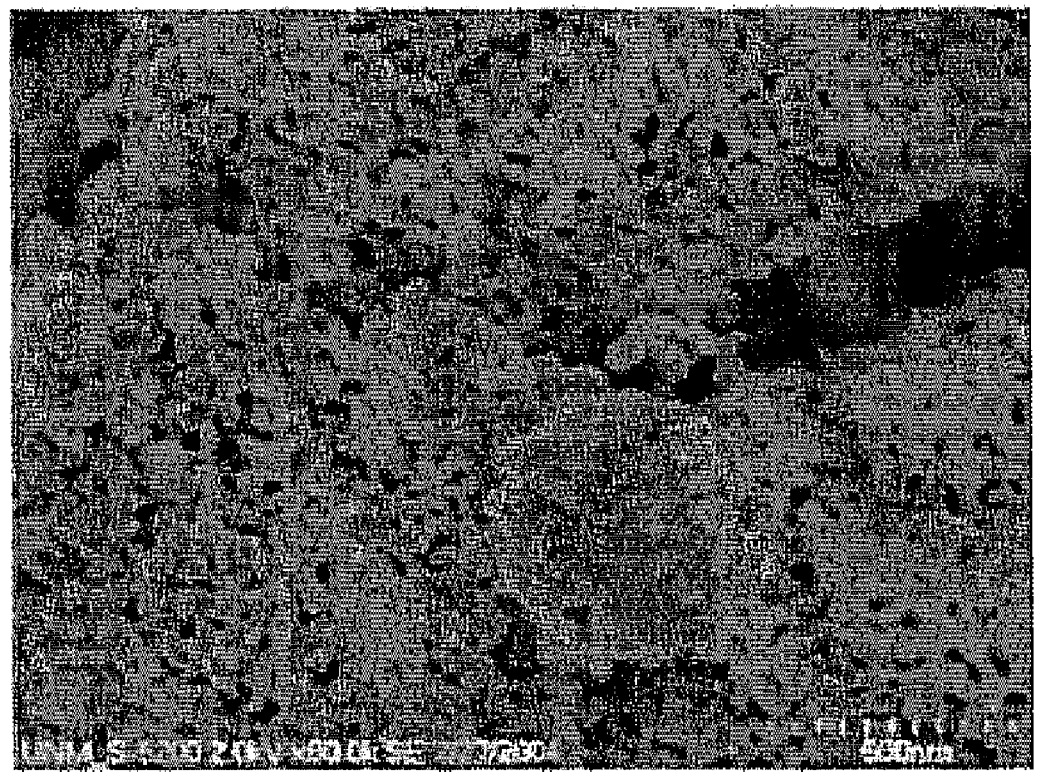
FIGURE 13

METAL OXIDE NANOPARTICLES AND PROCESS FOR PRODUCING THE SAME

This application claims priority of U.S. Provisional Patent Application Ser. No. 60/688,617 filed Jun. 8, 2005, which is incorporated herein by reference.

FIELD OF THE INVENTION

The invention relates to metal oxide nanoparticles and a process for producing metal oxide nanoparticles.

BACKGROUND OF THE INVENTION

The synthesis of stable nano-structured materials has been the focus of recent research efforts in both the academic and industrial sector. These materials may be applied in a variety of applications including high temperature semiconductors, as well as support materials for heterogeneous catalysts. Depending on the application, a high level of compositional and morphological control, as well as thermal stability is required. For example, nano-structured mixed metal oxides are commonly applied as catalytic supports in 3-way automotive catalysts. Traditional metal oxide materials found in 3-way catalysts, such as $Al_2O_3$, $ZrO_2$, and $CeO_2$ made by aqueous-phase precipitation will typically retain high (>50 $m^2/g$) surface area up to 800° C., but show significant loss of surface area and phase change when exposed to temperatures in excess of 1000° C. This loss of surface area can accelerate precious metal sintering and lead to a severe reduction in the efficiency of the catalyst.

There is therefore, a need in the art for a highly thermally stable metal oxide particle and a method of producing the metal oxide particle.

SUMMARY OF THE INVENTION

There is disclosed a process for producing metal oxide nanoparticles. The process includes the steps of: a) providing at least two precursor metal salt materials, b) passing the at least two precursor metal salt materials through a plasma torch forming a vaporized material, and then c) condensing the vaporized material forming a metal oxide nanoparticle.

BRIEF DESCRIPTION OF THE DRAWINGS

FIG. 13 shows electron microscope images of the cerium/aluminum oxide perovskite material after post-plasma treatment in hydrogen;

DETAILED DESCRIPTION OF THE PREFERRED EMBODIMENTS

Figure 1:
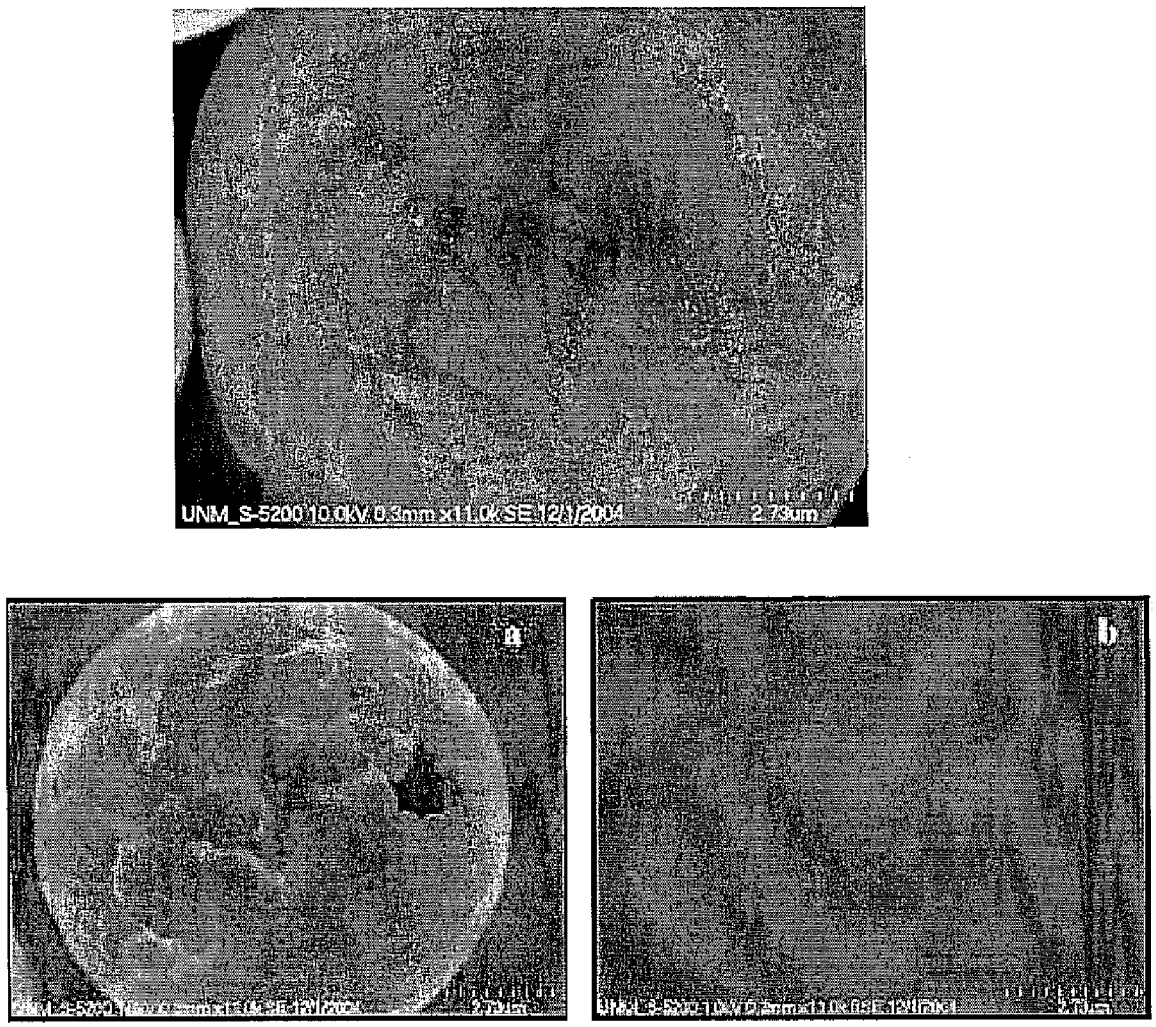
FIG. 1 shows electron microscope images of 75% cerium oxide, 25% aluminum oxide micron size particles with variegated surfaces.

The process of the present invention provides a novel alternative method to liquid phase precipitation of metal oxide particles. The process includes providing at least one precursor metal material. The precursor metal material is then passed through a plasma torch forming a vaporized material. The vaporized material is then condensed forming a metal oxide nanoparticle.

In one aspect of the present invention the precursor metal material may be a metal salt including salts of magnesium, aluminum, silicon, titanium, iron, copper, zinc, yttrium, zirconium, lanthanum, cerium, praseodymium, neodymium, or dysprosium. The salts can be nitrates acetates or mixtures of the two or any other salt such as chlorides, oxalates, and butoxides. This listing of salts is not an exhaustive list of the many metal salts that may be used by the present invention. Any metal salt may be used in the process of the present invention. The precursor metal material may be delivered to the plasma torch as either a wet or dry aerosol. The wet aerosol may be a liquid having the metal salts dissolved in a solvent. Various solvents may be used by the present invention including water, organic non-polar liquids such as hexane and polar organics such as methanol, various ethers, or acids. In one aspect of the present invention water may be used as a solvent.

A dry aerosol may be formed of a dry power of the precursor metal materials having a particle size in the range of 100 nm to 5 mm. In one aspect of the present invention the dry powder may be formed from a solution of precipitated salts of the metal precursor followed by drying and crushing to form the dry powder.

The precursor metal material is delivered to the plasma torch using a carrier gas. The carrier gas may be a noble gas, oxygen, nitrogen or mixtures of the preceding. The metal precursor material is dispersed in the carrier gas and feed to the plasma torch at a rate of from 1 $cm^3/min$ to 10 L/min. While the given flow rate is for an experimental apparatus embodying the present invention, it should be realized that a varying flow rate may be utilized in different sized applications of the process of the present invention.

The plasma of the plasma torch may be generated using a DC discharge, radio frequency energy or micro wave energy. The plasma may be generated using a power of from 200 to 100,000 Watts. The resulting temperature of the plasma exceeds 3000 degrees centigrade. In one aspect of the present invention the plasma torch may be a microwave plasma torch operated at atmospheric pressure.

The plasma torch offers several advantages for material synthesis over competing technologies. Traditional liquid phase methods rely on the natural crystallization process at or near room temperature conditions to form metal oxide particles. This process is extremely difficult to control and the resulting products are determined by the phases that are thermodynamically favored at the temperature of the process. In contrast, the plasma-based process described in this invention operates in the vapor phase at extremely high temperatures which allows for the formation of unique material phases. In addition, the rapid cooling of the particles allows for the formation of phases that may not be the most thermodynamically stable. Also, by modifying the parameters of the process, the average particle size of the metal oxide particles can be controlled to less than 10 nanometers, which is not possible using precipitation technology.

While in the hot zone of the torch, the metal precursors are vaporized and become intimately mixed. Once the material exits the hot zone, it cools extremely rapidly and condenses to form metal oxide particles having a nanoscale size. The nanoparticles formed include solid particles, hollow particles, core-shell particles and particles having a variegated surface. Additionally, the nanoparticles have a surface area of from 1 $m^2/g$ to 500 $m^2/g$ and show improved thermally durability at high temperatures avoiding sintering problems when used in an automotive catalyst, as described above relative to prior art liquid precipitation based metal oxides. The nanoparticles formed in the process of the present invention may be further exposed to a reducing atmosphere at an elevated temperature forming a perovskite material. Additionally, the nanoparticles formed by the process of the invention may be separated or filtered to isolate various particle sizes. In one aspect of the present invention the nanoparticles may be separated using a cyclonic type filter.

Various combinations of precursor metal materials may be used by the present invention resulting in a variety of structures of the nanoparticle produced by the process described above.

As outlined above, the nanoparticle may have a solid structure, a hollow structure, a core-shell structure or a variegated surface structure.

The precursor metal material may be a salt of aluminum and a salt of cerium with the nanoparticle formed having a core of cerium oxide surrounded by a shell of aluminum oxide. Additionally a salt of aluminum and a salt of cerium may be utilized to form a nanoparticle having a variegated surface of cerium oxide and aluminum oxide. The various structures may be formed by adjusting the processing parameters to form the different materials. For example, by modifying the stochiometric ratios of the precursor metal materials to 75% cerium, 25% aluminum in a powder form produced from water-dried precursors resulted in hollow micron-sized particles with a variegated surface, as shown in FIG. 1. The particle has discrete patches of $CeO_2$ and $Al_2O_3$ existing on the particle's surface.

Figure 2:
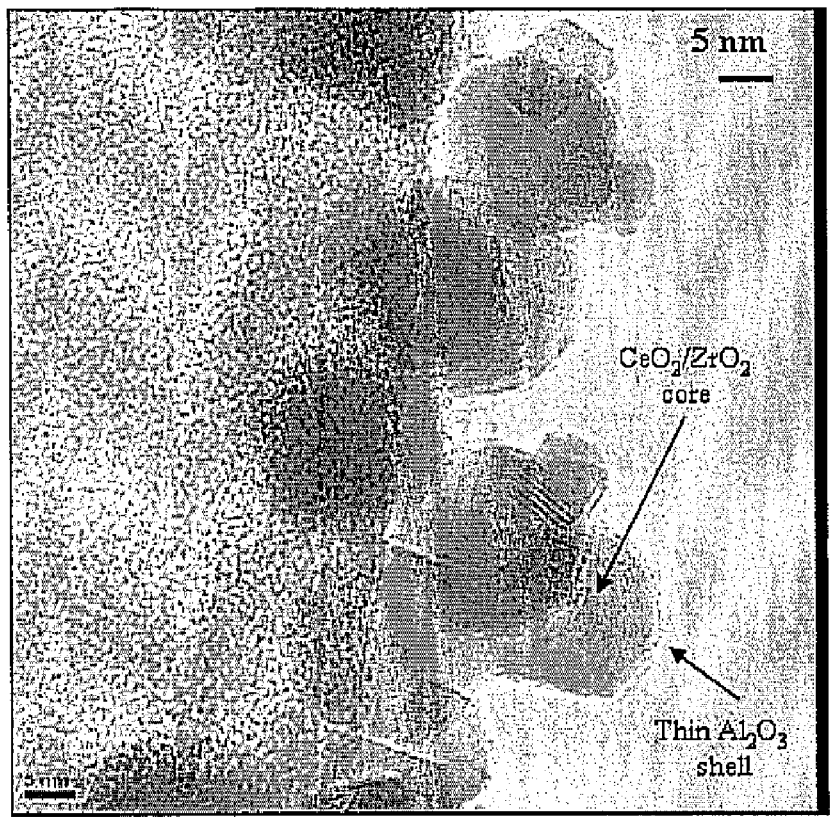
FIG. 2 shows electron microscope images of $CeO_2/ZrO_2$ core and $Al_2O_3$ shell nanoparticles.

The precursor metal material may also be a salt of aluminum, a salt of cerium, and a salt of zirconium. The resulting nanoparticle formed has a core of cerium and zirconium oxide surrounded by a shell of aluminum oxide, as seen in FIG. 2.

Figure 3:
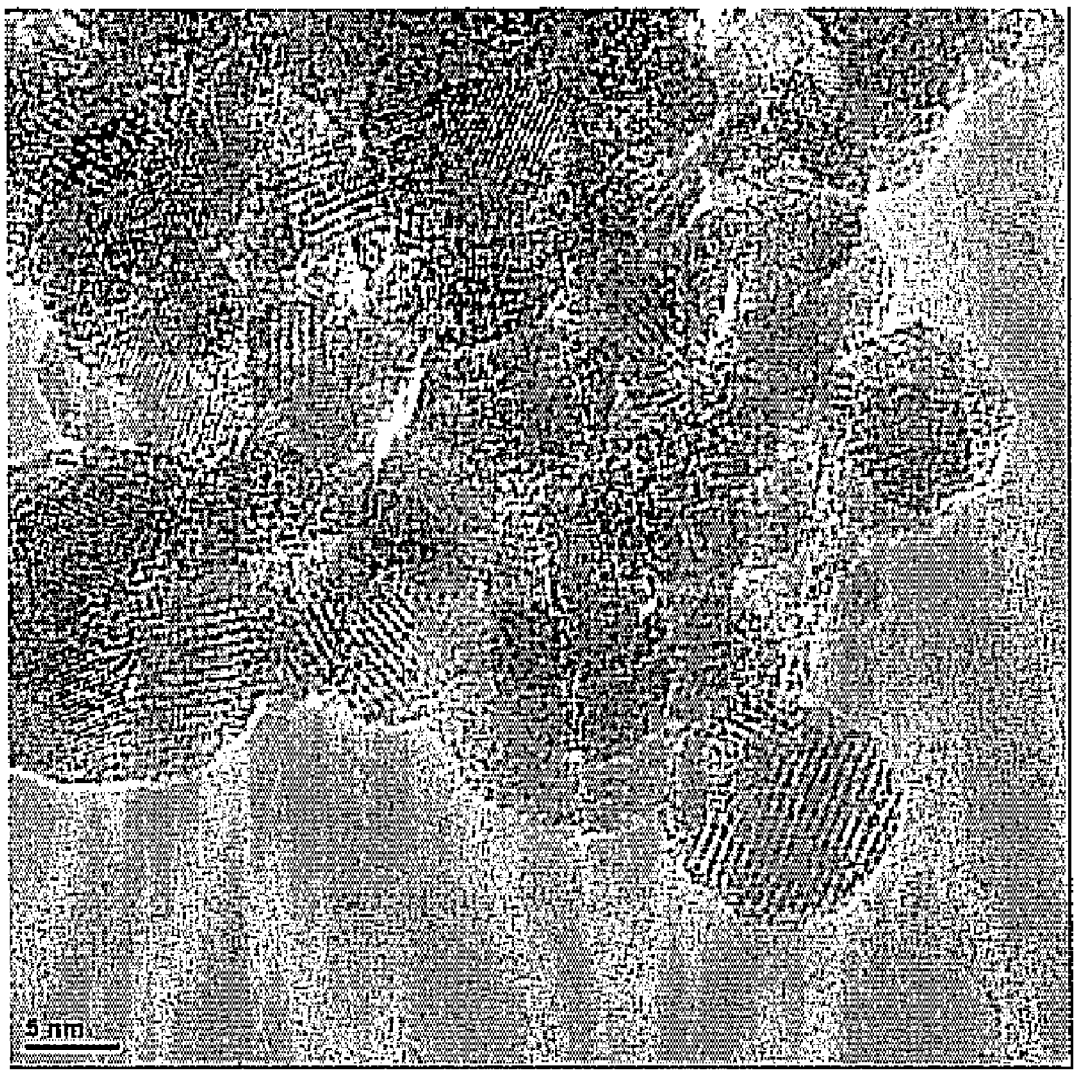
FIG. 3 shows electron microscope images of titanium oxide and aluminum oxide nanoparticles.

The precursor metal material may additionally be a salt of aluminum and a salt of titanium. The resulting nanoparticle as shown in FIG. 3 may have a core of titanium oxide surrounded by a shell of aluminum oxide or a solid solution of titanium oxide and aluminum oxide.

The precursor metal material may be a salt of cerium, and a salt of zirconium. The resulting nanoparticle formed has a solid structure of cerium and zirconium oxide.

The precursor metal material may be a salt of cerium, and a salt of titanium. The resulting nanoparticle formed has a solid structure of cerium and titanium oxide or a solid cerium oxide core with a titanium oxide shell.

The precursor metal material may be a salt of zirconium, and a salt of aluminum. The resulting nanoparticle formed has a solid structure of zirconium and aluminum oxide.

EXAMPLES

Figure 4:
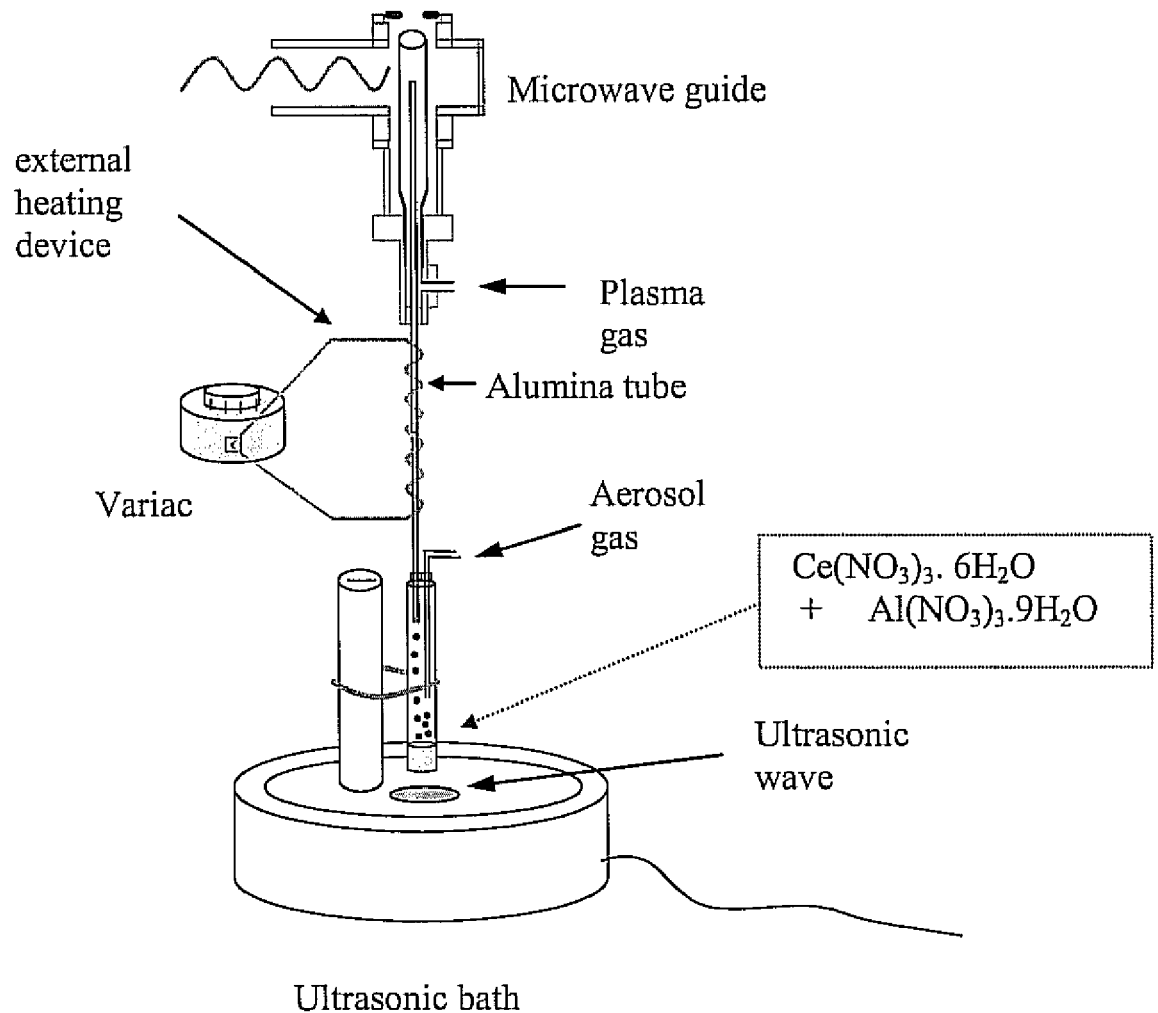
FIG. 4 is a diagram of an experimental apparatus used by the process of the present invention.

Plasma Torch—The torch system employed in the examples is shown in FIG. 4. For liquid precursors, a modification in the feed system was introduced. An ultrasonic bath was used in order to produce a mist that was then swept into the torch via the carrier gas. In general, 900 Watts of microwave power was used with an argon plasma gas flow rate of 2.5 slpm. A combination of argon and oxygen was used as an aerosol carrier gas, with 0.52 slpm (Ar) and 5-6 slpm ($O_2$) In a few cases, as indicated, 500 Watts were used and/or pure argon was employed as the carrier gas.

Methods of Generation—Different precursor routes were employed. In one case a dry powder aerosol was used, and in another an aqueous solution containing dissolved salts was passed directly through the torch. In all cases reported herein the molar ratio of aluminum/cerium in the precursor was 1:1.

The precursors for the first dry aerosol technique (Method B) were from an equimolar Ce/Al aqueous solution that was prepared from cerium and aluminum nitrates. The liquid was then slowly evaporated at about 70° C., and the powder remaining after complete evaporation crushed in a small laboratory mortar and pestle. Plasma treated product was generated at a rate of about 100 mg/hr. The second type of precursor (Method D) was made from the equimolar Ce/Al aqueous solution described above and was fed through the torch as a wet aerosol using argon/oxygen as the carrier, producing approximately 90 mg/hr of product. A summary of the different precursor preparation methods is shown in Table 1.

TABLE 1

Summary of precursor prepared methods for materials produced at 900 W

| Method | Material Flow Rate (mg/hr) | Mixing of precursors | Solvent |
|---|---|---|---|
| B | 100 | Dissolved, evaporate solvent at 70 C., Crush | none |
| D | 90 | Dissolved | water |

Post-Torch Processing—In a few cases, particles generated in the torch were processed in a tube furnace in a flowing gas mixture (7% hydrogen in helium, reducing conditions) at an elevated temperature (800° C. or 900° C.) for 2 to 10 hours.

Analytical Techniques—Both products and precursors were analyzed using a scanning electron microscope (SEM, 5200 Hitachi), transmission electron microscope (TEM, JEOL 2010) and a Philips 2θ x-ray diffractometer.

Figure 5:
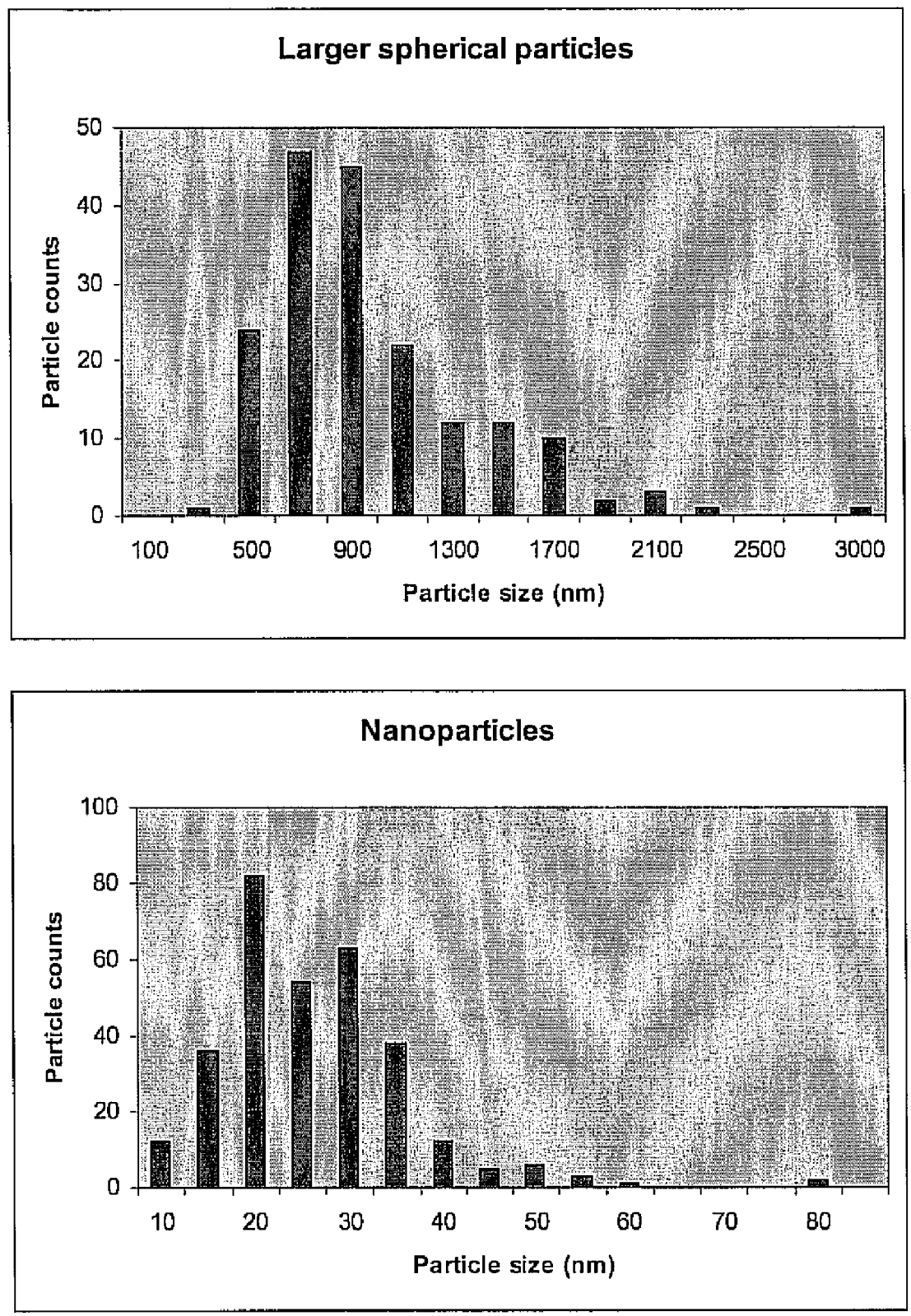
FIG. 5 is an example of the particle size distribution of the Al—Ce oxide material generated by the experimental apparatus.

Methods B and D produced a bimodal distribution of hollow micron-sized spheres combined with nanoparticles. Upon further investigation with TEM, the nanoparticles were observed to have a unique core-shell structure in which ceria formed the core and alumina formed the shell. FIG. 5 shows representative particle size distributions for materials made using method D. Due to the bimodal nature of the sample, 2 separate PSDs are presented based on data collected from SEM (micron-sized) and TEM (nano-sized).

Figure 6:
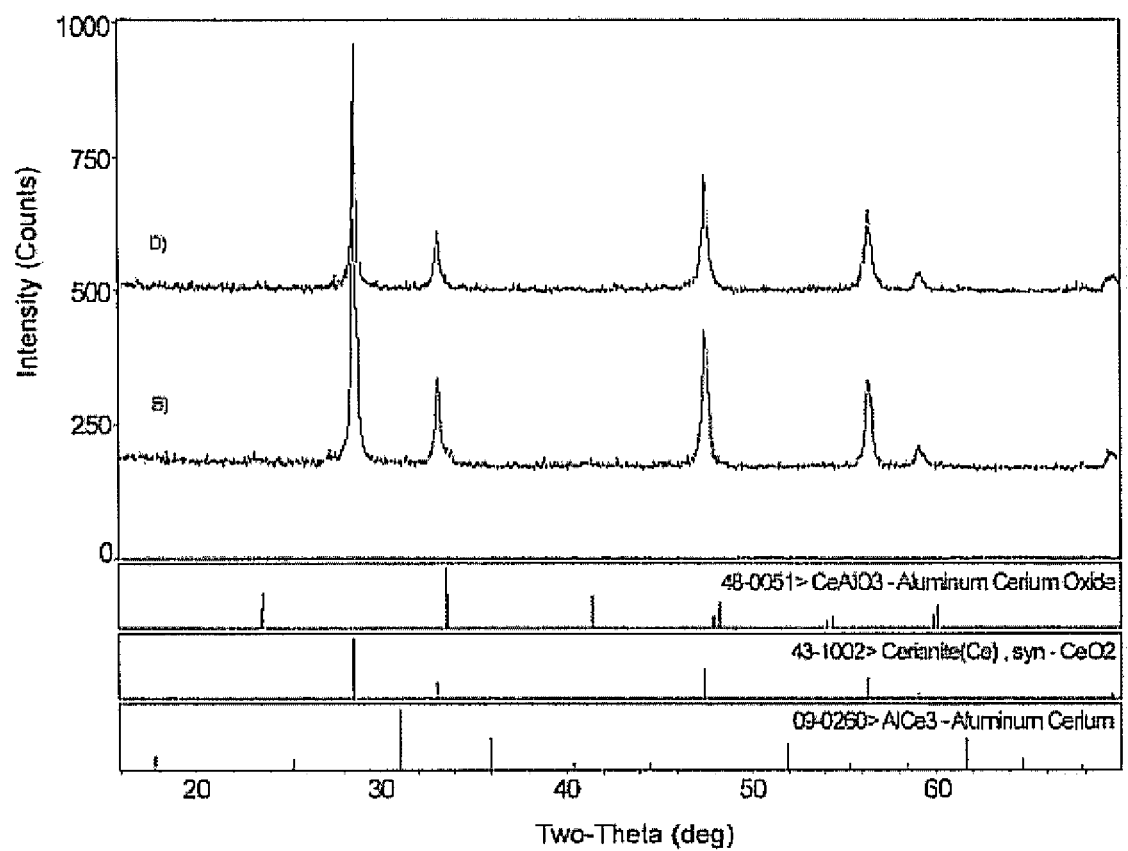
FIG. 6 summarizes the x-ray diffraction patterns obtained using different operating conditions.

XRD analysis of the product materials reveals that the dominant crystalline phase is ceria ($CeO_2$), regardless of the precursor. Trace amounts of a perovskite phase (CeAlO₃) were visible in Method D. It is noteworthy to mention that XRD did not show the presence of any crystalline phases of alumina (Al₂O₃) in any of the materials produced. Representative XRD patterns for each of the types of precursors are shown in FIG. 6. The significant observations from the analysis of the materials made using each method are summarized in Table 2 and described in more detail below.

TABLE 2

Summary of key properties of the materials produced at 900 W

| Method | Compositional Variation | Particle Morphology | XRD phases | Surface Area (m2/g) |
|---|---|---|---|---|
| B | homogeneous | Bimodal psd; 90% micron sized (30% hollow); 10% nano-sized | CeO2, CeAlO3 | 5.0 |
| D | homogeneous | Bimodal psd; 30% micron sized (100% hollow); 70% nano-sized | CeO2 | 41 |

Method B

Figure 7:
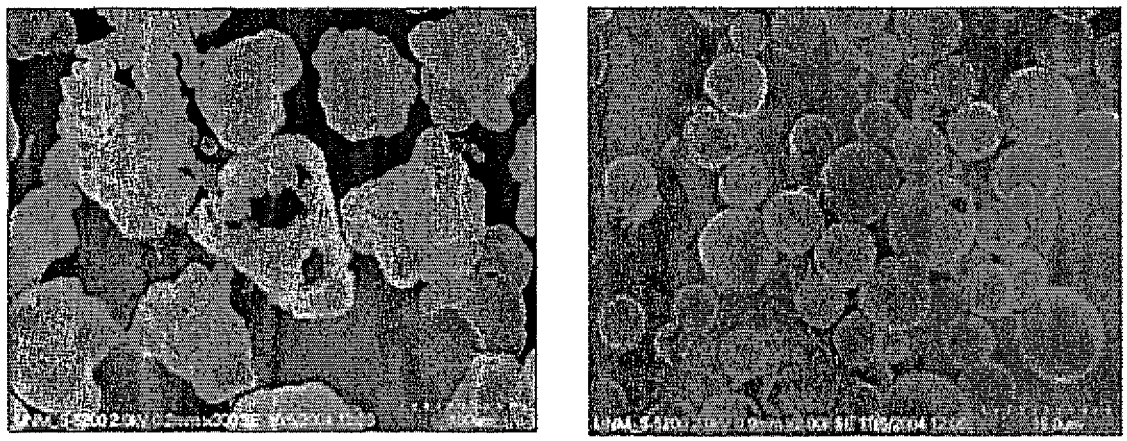
FIG. 7 shows electron microscope images of micron size particles created by the microwave plasma torch.
Figure 8A:
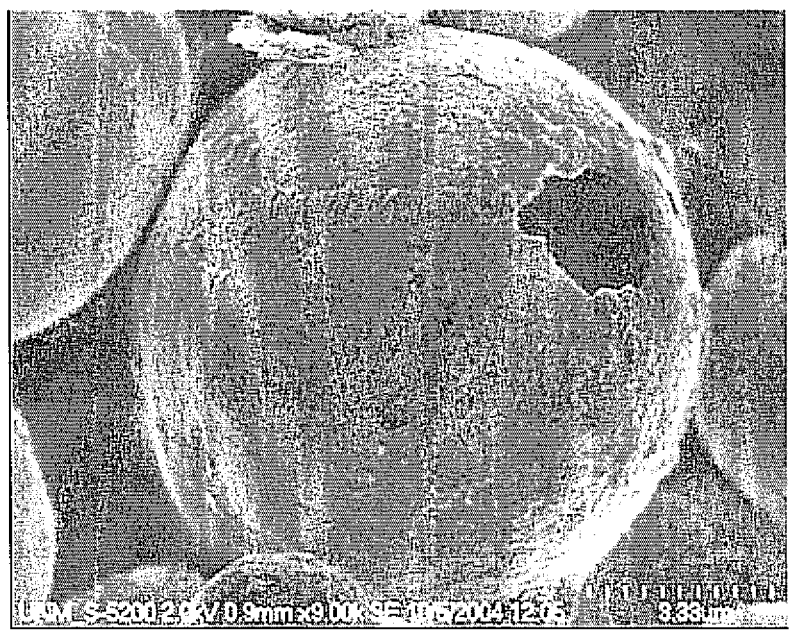
FIG. 8 shows electron microscope images of hollow micron sized particles created by the microwave plasma torch.
Figure 8B:
Figure 8C:
Figure 8D:
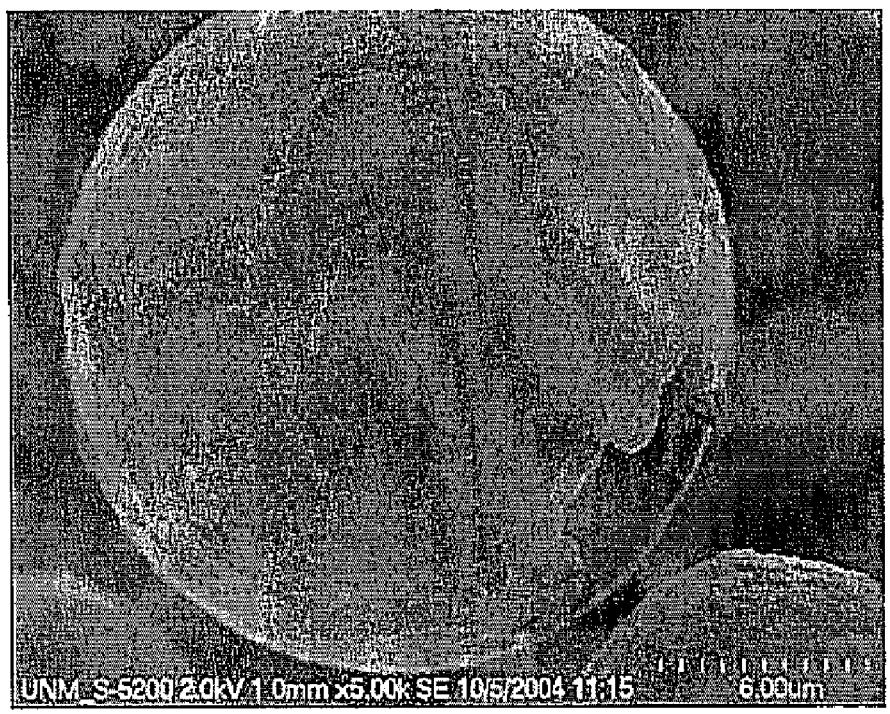

Three discrete types of structures were found in samples made using this method: smooth surfaced solid micron sized (ca. 10 micron) spheres (see FIG. 7), hollow micron sized spheres (ca. 20% by volume), and a few large (ca. >100 micron) irregularly shaped agglomerates (ca. 5% by volume) composed of nanoparticles. The presence of a hollow sphere is reminiscent of structures found from particles made using standard aerosol techniques, however, the agglomerate structures appear to be unique to this method. It is also interesting to observe that although the hollow spheres are many microns across the shell thicknesses are of the order of only 0.5 micron (see FIG. 8).

EDS analysis suggests there are moderate differences in composition between some of the micron scale particles. This result suggests that a precursor made from a dried residue of fully dissolved salts creates precursor solids that are homogenous on the sub-micron scale.

Figure 9A:
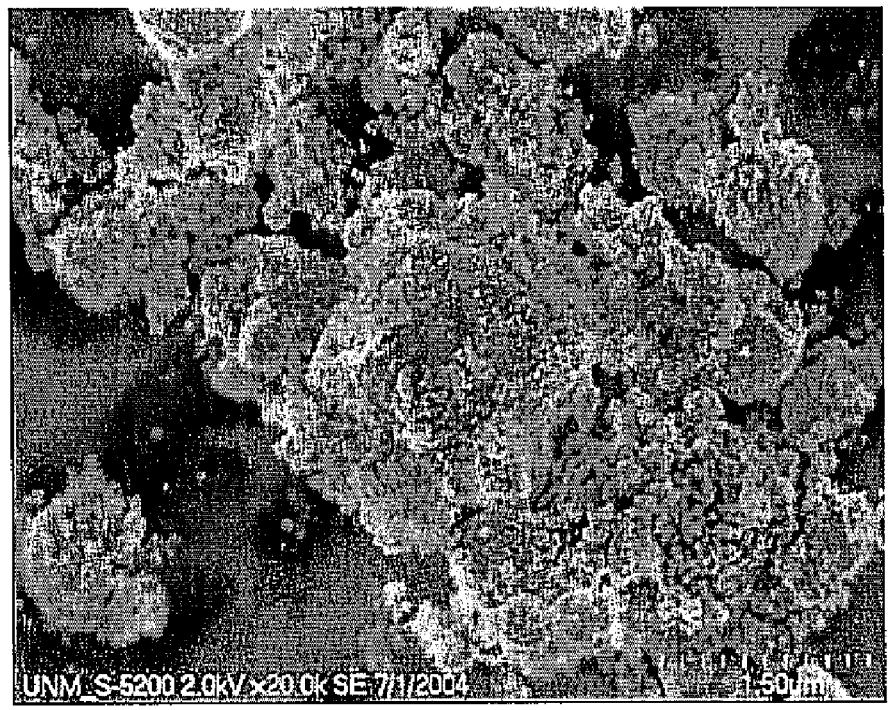
FIG. 9 shows electron microscope images of the nanoparticles and agglomerated nanoparticles created by the microwave plasma torch.
Figure 9B:
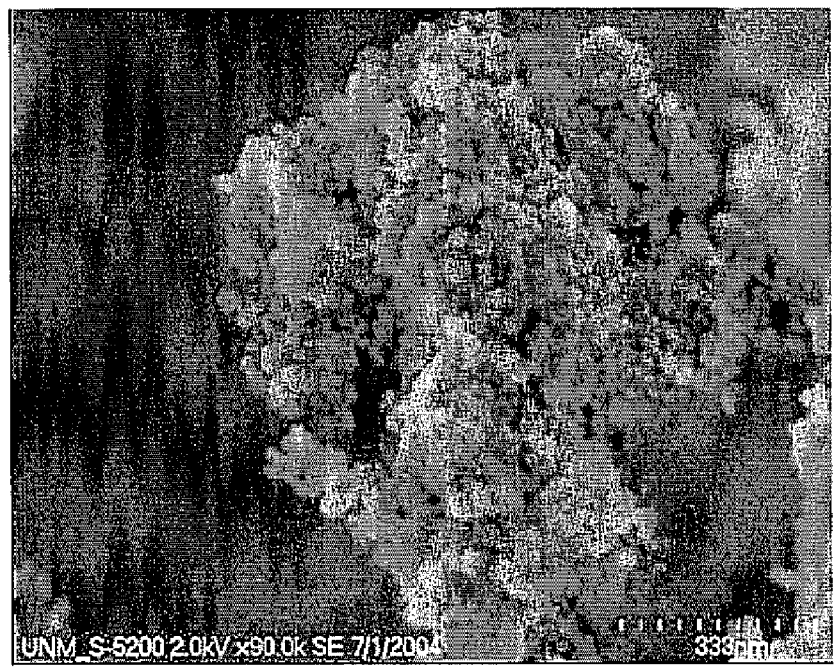
Figure 9C:
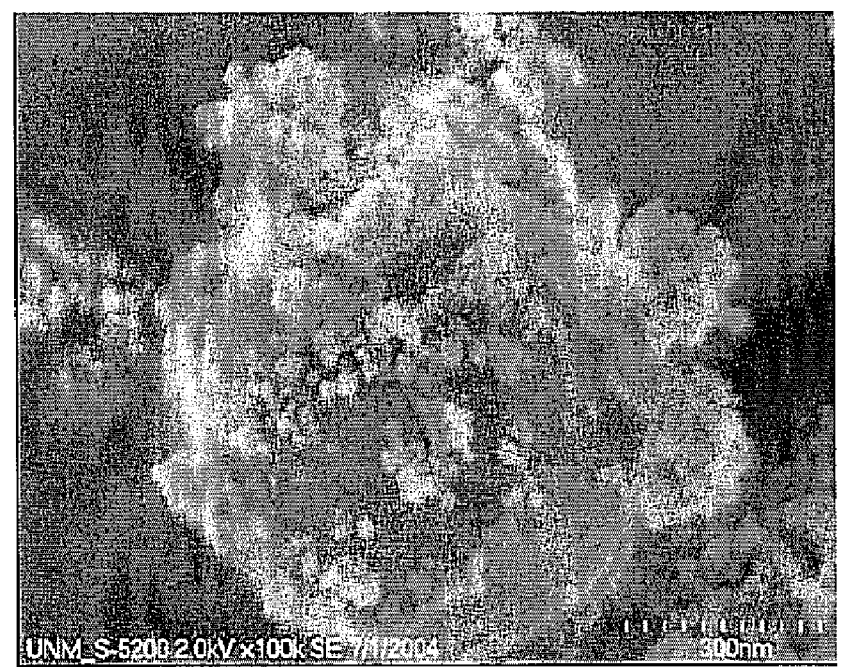

METHOD D—In this precursor route, only hollow and agglomerates composed of nanoscale particles were found. The micron-sized solid particles with smooth surfaces observed with Method B were not present. Also, the majority of the spherical particles are decorated with nano-scale particles (FIG. 9). In fact, most (ca. 70% by volume) of the product appears to be the nano-scale agglomerates. Another major difference is the compositional uniformity found using this method. Indeed, there was no detectable difference in the overall composition of any of the particles.

Figure 10:
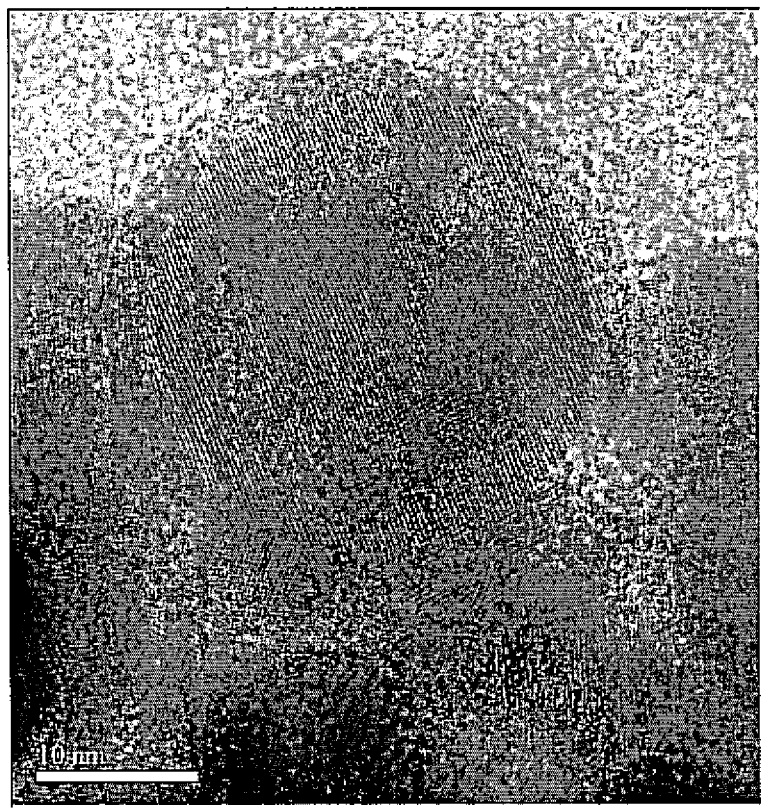
FIG. 10 shows a magnified electron microscope view of a single core-shell nanoparticle.
Figure 11A:
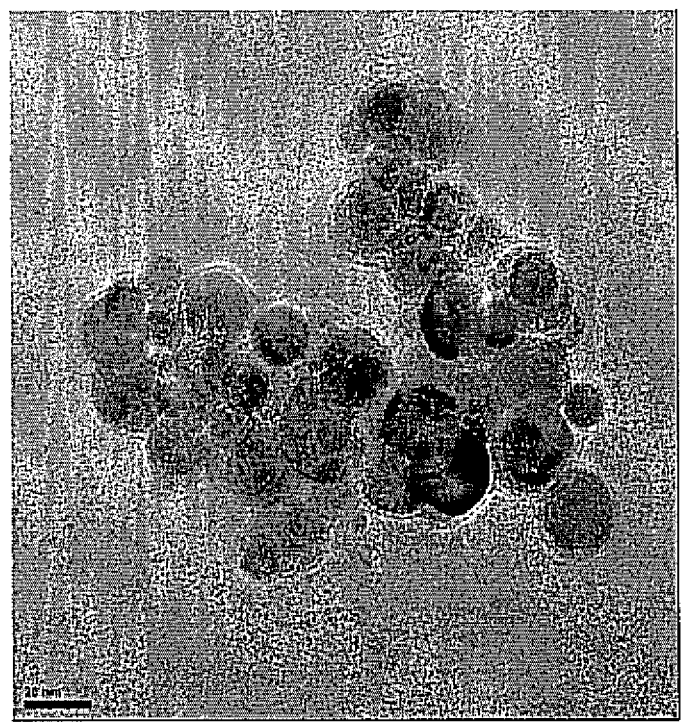
FIG. 11 shows electron microscope images of the core shell nanoparticles created by the microwave plasma torch.
Figure 11B:
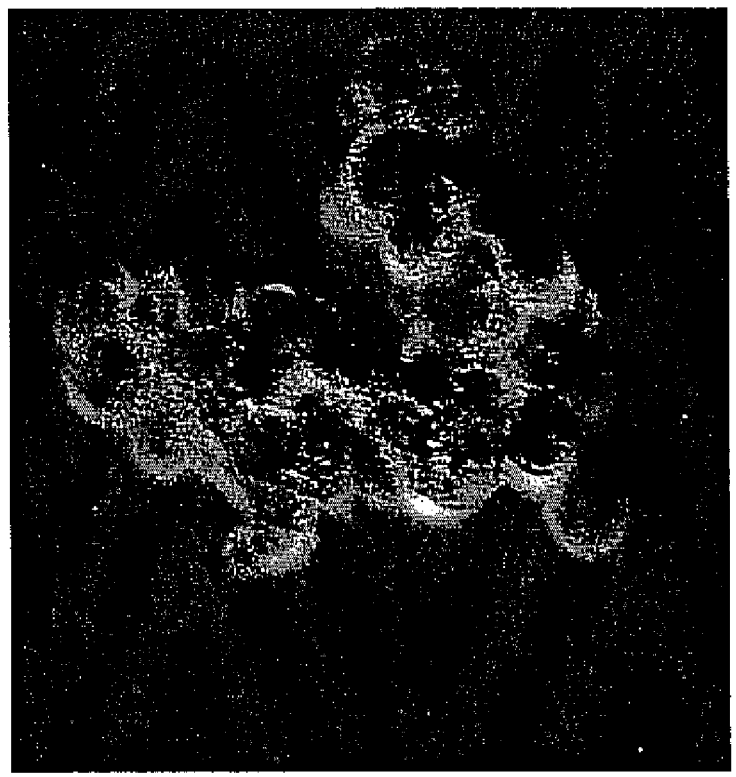
Figure 11C:
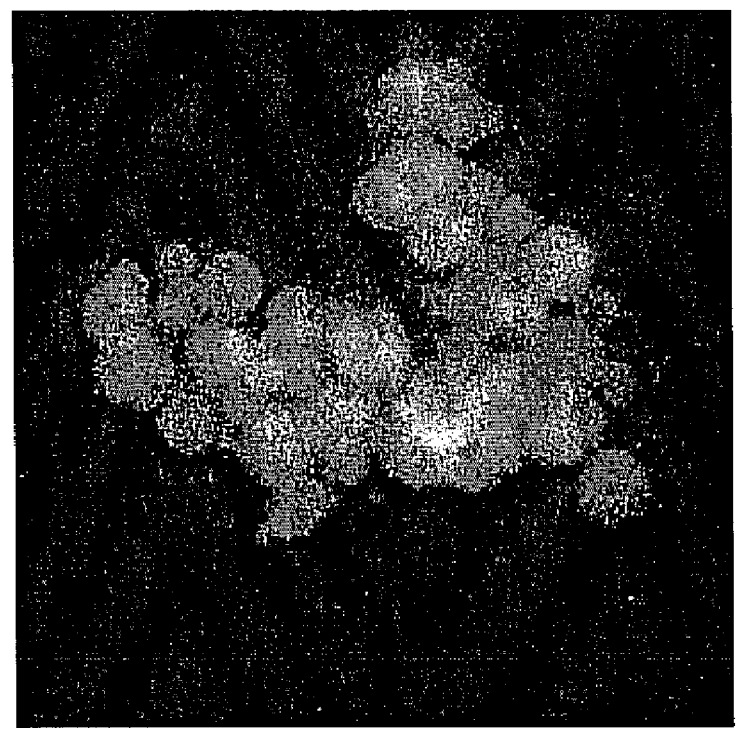

In this case transmission electron microscopy was used to examine individual nano-particles. Analysis using bright field imaging (FIG. 10) and dark field imaging (FIG. 11) clearly show that the nanoparticles to have a core-shell morphology. Based on EDS and TEM analysis, the outer layer is composed primarily of amorphous alumina and the core is crystalline ceria. This observation is also consistent with XRD data, which shows the almost exclusive presence of crystalline CeO₂ and the complete lack of crystalline Al₂O₃. The surface area of these samples was measured to be 40±1 m²/gm using BET.

Figure 12:
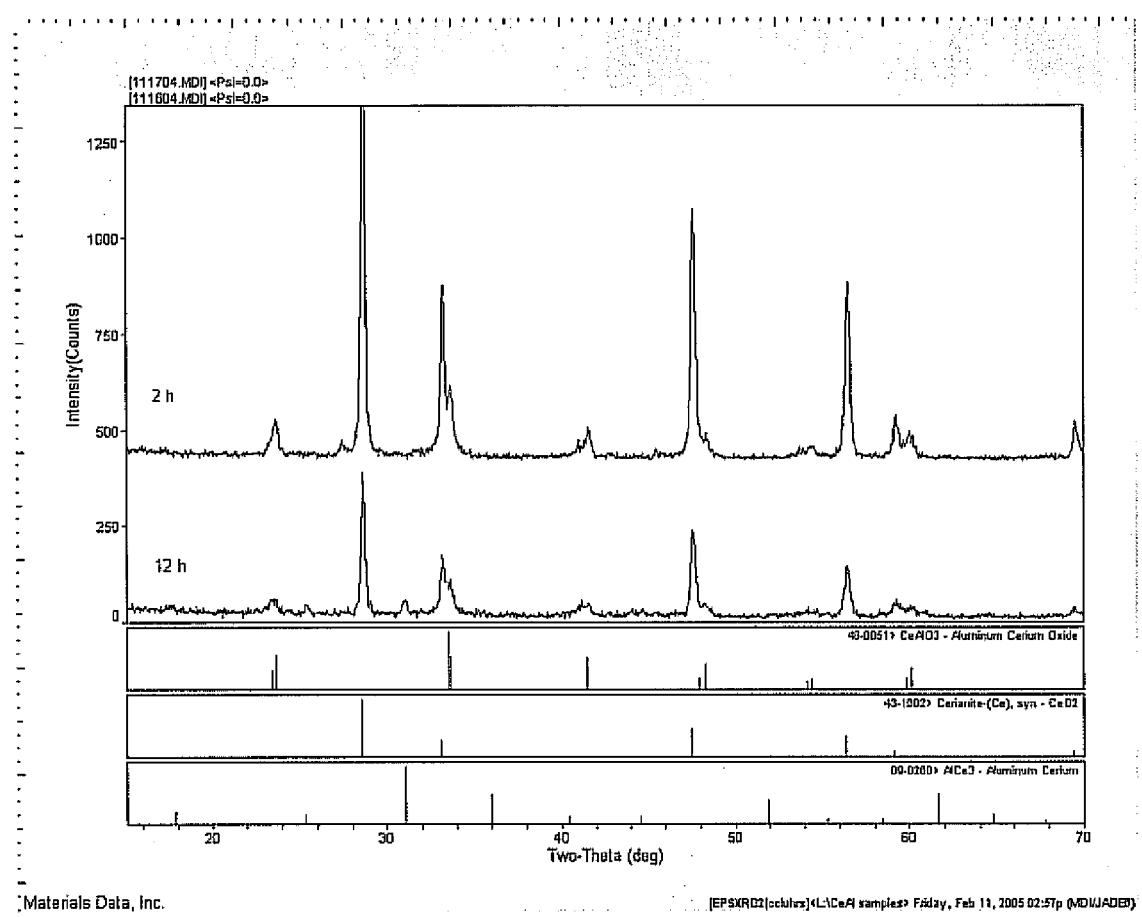
FIG. 12 shows the x-ray diffraction patterns of cerium/aluminum oxide material after post-plasma treatment in hydrogen.

Post-Plasma Treatments—Samples made with methods B and D were treated in a reducing atmosphere at either 800 or 900° C. for up to ten hours. The treatments at 800° C. had little apparent effect. However, a two-hour treatment for material produced using Method D at 900° C. converted a significant fraction of the material to the perovskite phase, based on XRD measurements. Additional treatment time at 900° C. had little impact on the relative concentration of the phases (see FIG. 12). Surface area measurements of the sample made using Method D, performed after the partial conversion to perovskite, via the 900° C. treatment, showed a significant decrease in surface area to only 10±1 m²/gm. SEM studies were consistent with this indicating that the nanoparticles grew and agglomerated during conversion of the material to the perovskite phase (FIG. 13).

Based on the results presented above, the formation of mixed-metal oxide particles in the plasma torch is a very complex process. Seemingly minor changes in the preparation precursor result in major changes in morphology and composition of the resulting particles. As outlined above, the plasma torch was able to make hollow or solid spherical particles, as well as nanoparticles with a core shell structure.

The homogeneity of the final product is directly correlated to the level of atomic mixing in the precursor material itself. In the liquid precursor, the metal atoms will initially be nearly evenly distributed on an atomic scale and this will result in an atomic level of mixing in the final product. Not surprisingly, given this model, the most uniform material is made using Method D.

The presence of water or a solvent in the system also appears to be a key factor in determining the properties of the final material. There is a striking correlation between the amounts of water in the system as the precursor enters the torch and the morphology of the final product. In the water-based methods of Methods B and D hollow micron-sized particles are observed. In addition, the relative amount of the hollow particles seems to correlate with the amount of water in the system, 20% hollow particles for Method B and nearly 100% using Method D. The presence of water is acting as a blowing agent that creates micron-size bubbles in the plasma which later results in hollow particles. In this model, first the micron scale agglomerates of nitrates, probably hydrated in the event that water is a component of the precursor, enter the torch. Second, the precursors decompose releasing gas. Third, as vapor is released by the decomposition process, the remaining metal ions which are liquid/plastic in the plasma zone are forced outward, resulting in the formation of an expanding liquid/plastic shell. Fourth, as the particles leave the plasma 'hot zone' they solidify as hollow spheres.

Figure 14:
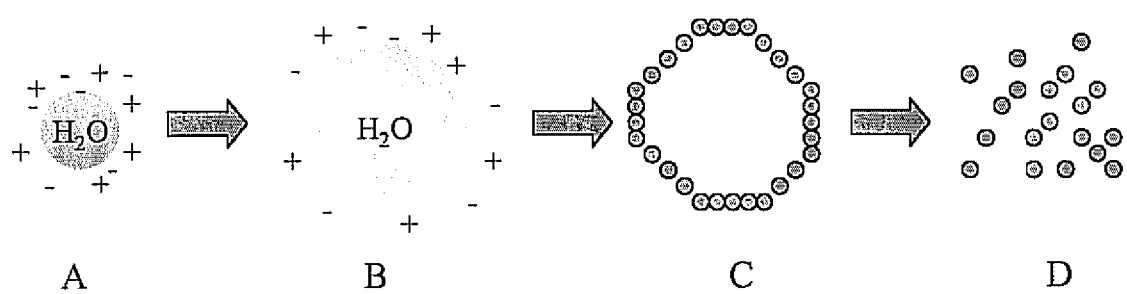
FIG. 14 show a schematic representation of the mechanism of hollow micron-size particle and nanoparticle formation.

In addition to the presence of hollow micron-sized particles, the presence of nanoparticles in the final samples also seems to be highly correlated to presence of water in the precursor material. This fact, combined with the observation that the hollow particles typically have very thin walls and sometimes appear to be broken, lead to the conclusion that the nanoparticles form as a result of shattered hollow micron-sized particles. It is likely that shattering takes place after the spheres leave the highest temperature zone of the plasma. In that zone the particles are likely liquid, and hence will not shatter. Once in the cool zone the particles will begin to freeze and solidify, which likely produces tremendous strains. There is evidence to suggest that hollow particles with too thin a shell are unlikely to survive the freezing process. Indeed, examination of the thickness of fifteen shells shows they vary in thickness from 200 to 800 nm. In contrast, the 'shattered' pieces that compose the nanoparticle agglomerates are generally no larger than 250 nm. The size of the pieces must be of the same size of the 'shattered' shell that produced them. Thus, it can be reasonably postulated that shells thicker than about 250 nm are stable and will not readily shatter. A schematic representation of the formation of the hollow particles and nanoparticles is shown in FIG. 14.

Due to the unique nature of the particles produced by the process of the present invention, it is logical to assume that phase segregation observed in this system is driven by the extremely high temperatures and short contact times experienced inside the plasma torch hot zone.

From the viewpoint of thermodynamics, alumina is known to have a lower surface energy than ceria. This is the primary reason that aluminum oxide tend to retain high surface area much more so than cerium oxide. Therefore one possibly driving force for the segregation of alumina to the outside of each particle is a minimization of surface energy. From a kinetics point of view, aluminum ions are known to be both lighter and smaller (lower ionic radius) compared to cerium ions. As during all oxidation process, the smaller and lighter cation is likely to be the one that diffuses outward during the oxidation process. In either case, the very short residence time of particles in the hot zone limits the length scale at which this segregation can take place. The very rapid cooling of the particles ensures that the core-shell material is frozen in this meta-stable state.

The XRD and EDS data clearly indicates the presence of crystalline ceria and amorphous alumina that is uniformly distributed throughout the sample, on the micron-scale. Is it therefore highly likely that sintered ceria-alumina core subunits are the basic building block for the materials in which atomic-scale mixing of the precursors was achieved in Methods B and D.

Finally, in addition to the unique core-shell nanoparticles created using this technique, it was also possible to form the $CeAlO_3$ perovskite phase by treating the core-shell nanoparticles under reducing conditions at 900° C. The perovskites may be used as oxygen buffers in automotive catalyst systems.

As can be seen from the above, the process of the present invention can be employed to make Ce—Al oxides in a wide variety of forms including nanoparticles, micron scale hollow particles, and solid micron sized spheres. The level of homogeneity in the precursor material as well as the amount of water in the precursor have both been identified as key parameters that control the composition and morphology of the final product. In addition, the core-shell nanoparticles can be converted, post plasma, to relatively high surface area perovskite, via treatment at 900° C. under reducing conditions. In the presence of a blowing agent, such as water, the precursors expand as liquid spheres in the hot zone of the plasma. Depending on the exact condition, this form either solidifies after the particles leave the hot zone, or the solid/liquid shell of the particle shatters to produce a large number of nanoparticles. The result of the process is a bimodal particle size distribution. In the absence of an effective blowing agent, the particles are solid and grow by normal agglomeration, such that a monomodal micron scale particle size distribution is created. The nanoparticles produced have a unique core-shell structure in which the core is composed crystalline ceria and the shell is composed of amorphous alumina. Possible applications of the materials prepared by this technique include high surface area perovskite-based catalysts, catalyst supports with high oxygen capacity and thermal durability, and high temperature semiconductor materials.

While the above examples provide a description of the process of the present invention, they should not be read as limiting the process of the present invention. Specifically, various precursor metal materials may be utilized by the present invention.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A process for producing metal oxide nanoparticles comprising the steps of:
    a) providing at least two precursor metal salt materials;
    b) passing the at least two precursor metal salt materials through a plasma torch forming a vaporized material;
    c) condensing the vaporized material forming a metal oxide nanoparticle
    wherein the metal oxide nanonarticle includes hollow particles, core-shell particles and particles having a variegated surface.

2. The process of claim 1 wherein the precursor metal salt material is selected from the group consisting of: salts of magnesium, aluminum, silicon, titanium, iron, copper, zinc, yttrium, zirconium, lanthanum, cerium, praseodymium, neodymium, or dysprosium.

3. The process of claim 2 wherein the salts comprise nitrates.

4. The process of claim 2 wherein the salts comprise acetates.

5. The process of claim 2 wherein the precursor metal salt material is a dry powder.

6. The process of claim 5 wherein the dry powder has a particle size of from 100 nm to 5 mm.

7. The process of claim 2 wherein the dry powder is formed from a solution of precipitated salts of the metal precursor followed by drying and crushing to form the dry powder.

8. The process of claim 2 wherein the precursor metal salt material is a liquid.

9. The process of claim 8 wherein the liquid includes the salt dissolved in a solvent.

10. The process of claim 9 wherein the solvent is selected from the group consisting of: water, organic non-polar liquids, organic polar liquids, ethers and acids.

11. The process of claim 1 wherein the metal precursor salt material is dispersed in a caner gas.

12. The process of claim 11 wherein the carrier gas is selected from the group consisting of: noble gases, oxygen, and nitrogen or mixtures thereof.

13. The process of claim 11 wherein the carrier gas has a flow rate of from 1 $cm^3$/min to 10 L/min.

14. The process of claim I wherein the plasma is generated using a DC discharge, radio frequency energy or microwave energy.

15. The process of claim 1 wherein the plasma is generated using a power of from 200 to 100,000 Watts.

16. The process of claim 1 wherein The plasma torch has a temperature greater than 3000 degrees centigrade.

17. The process of claim 1 including the step of exposing the nanoparticles to a reducing atmosphere at an elevated temperature forming a perovskite material.

18. The process of claim 1 including the step of separating the nanoparticles into desired sizes.

19. The process of claim 1 wherein the nanopartiele has a surface area of from 1 $M^2$/gram to 500 $m^2$/gram.

20. The process of claim 1 wherein the precursor metal salt materials comprise a salt of aluminum and a salt of cerium.

21. The process of claim 20 wherein the particle formed has a core of cerium oxide surrounded by a shell of aluminum oxide.

22. The process of claim 21 wherein the particle formed has a variegated surface of cerium oxide and aluminum oxide.

23. The process of claim 1 wherein the precursor metal salt materials comprise a salt of aluminum, a salt of cerium, and a salt of zirconium.

24. The process of claim 23 wherein the nanoparticle formed has a core of cerium and zirconium oxide surrounded by a shell of aluminum oxide.

25. The process of claim 1 wherein the precursor metal salt materials comprise a salt of aluminum and a salt of titanium.

26. The process of claim 25 wherein the nanoparticle formed has a core of titanium oxide surrounded by a shell of aluminum oxide.

27. A metal oxide nanoparticle having a core and shell structure of at least two metals.

28. The metal oxide nanoparticle of claim 27 wherein the nanoparticle has a core of cerium oxide surrounded by a shell of aluminum oxide.

29. The metal oxide nanoparticle of claim 27 wherein the nanoparticle has a core of cerium oxide and zirconium oxide surrounded by a shell of aluminum oxide.

30. The metal oxide nanoparticte of claim 27 wherein the nanoparticle has a core of titanium oxide surrounded by a shell of aluminum oxide.

31. A metal oxide particle having a variegated surface of cerium oxide and aluminum oxide.

* * * * *

UNITED STATES PATENT AND TRADEMARK OFFICE
CERTIFICATE OF CORRECTION

PATENT NO. : 7,629,553 B2  Page 1 of 1
APPLICATION NO. : 11/449373
DATED : December 8, 2009
INVENTOR(S) : Fanson et al.

It is certified that error appears in the above-identified patent and that said Letters Patent is hereby corrected as shown below:

Column 8, line 52 replace the letter "I" with the number --1--

Column 8, line 57 replace "The" with --the--

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,629,553 B2  Page 1 of 1
APPLICATION NO. : 11/449373
DATED : December 8, 2009
INVENTOR(S) : Fanson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 359 days.

Signed and Sealed this

Second Day of November, 2010

David J. Kappos
*Director of the United States Patent and Trademark Office*